Figure 1:
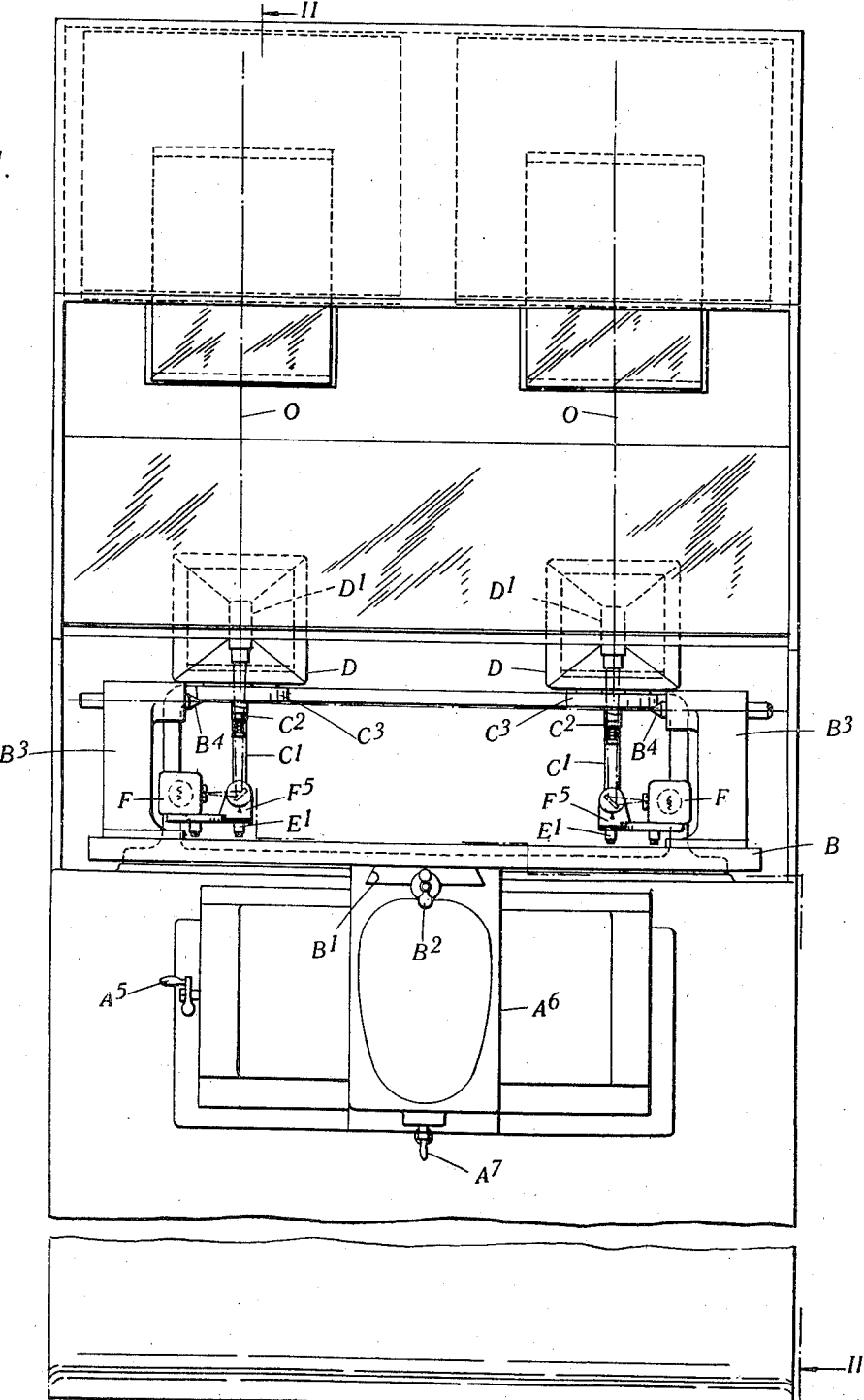

Nov. 14, 1939.　　　　A. C. PHILLIPS　　　　2,179,799
OPTICAL PROJECTION APPARATUS
Filed April 27, 1938　　8 Sheets-Sheet 1

Nov. 14, 1939.　　　A. C. PHILLIPS　　　2,179,799
OPTICAL PROJECTION APPARATUS
Filed April 27, 1938　　　8 Sheets-Sheet 3
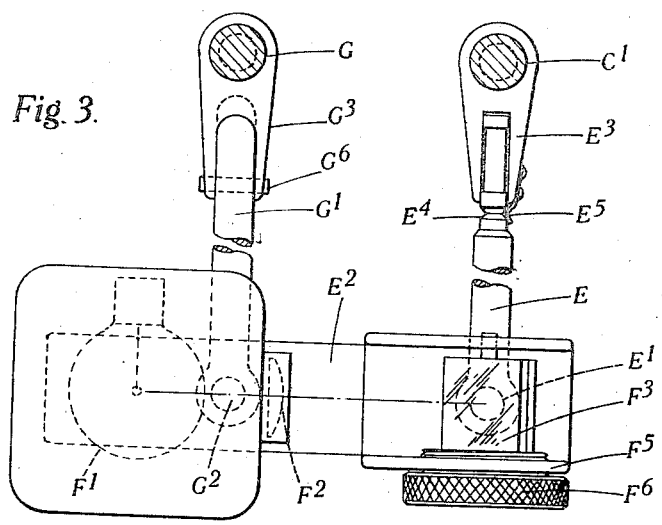
Fig. 3.
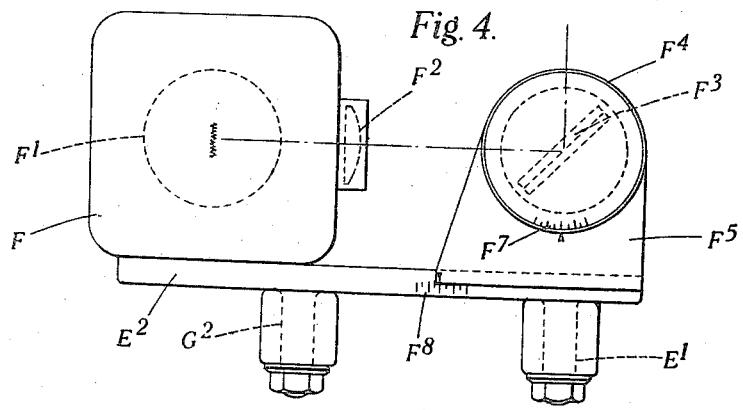
Fig. 4.
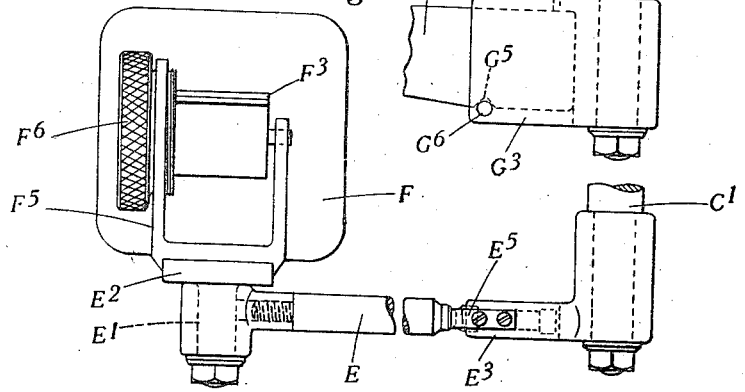
Fig. 6.
Fig. 5
INVENTOR
A. C. Phillips
BY
ATTORNEYS Nov. 14, 1939.　　　　　A. C. PHILLIPS　　　　　2,179,799
OPTICAL PROJECTION APPARATUS
Filed April 27, 1938　　　8 Sheets-Sheet 4
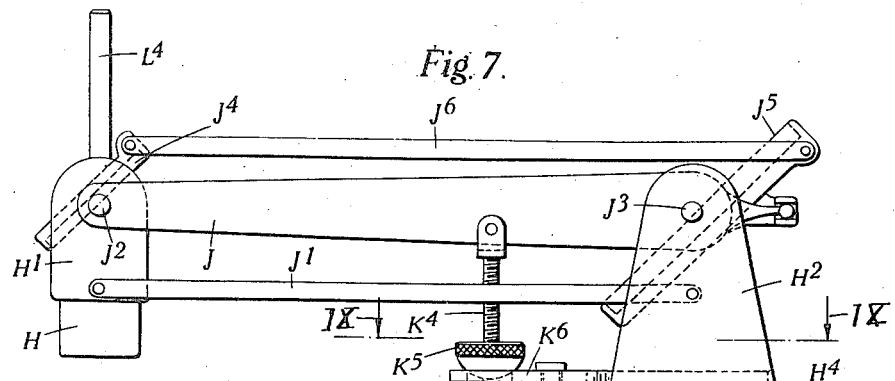
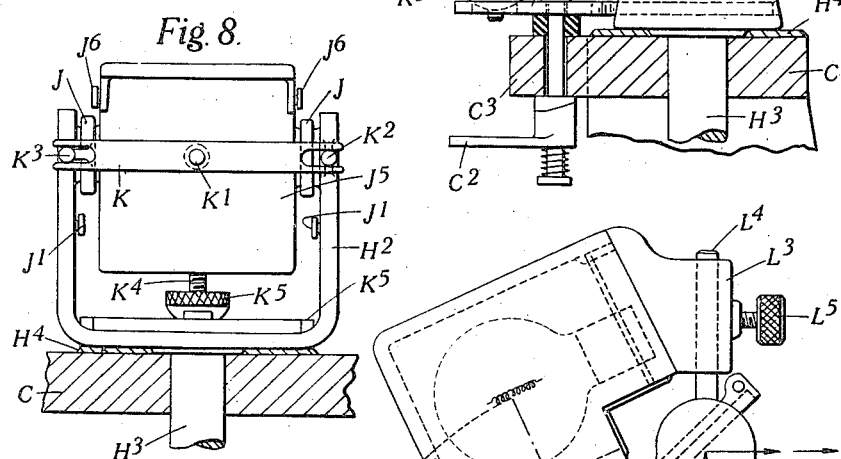
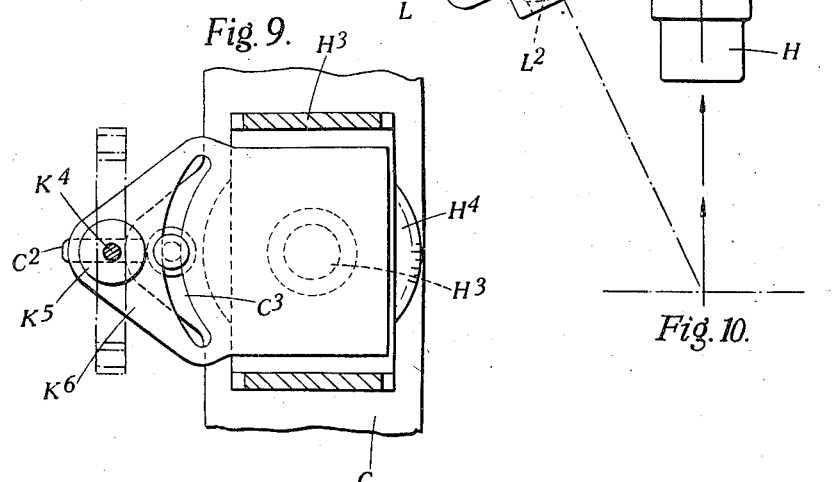
A. C. Phillips INVENTOR
BY
ATTORNEYS Nov. 14, 1939.  A. C. PHILLIPS  2,179,799
OPTICAL PROJECTION APPARATUS
Filed April 27, 1938  8 Sheets-Sheet 5
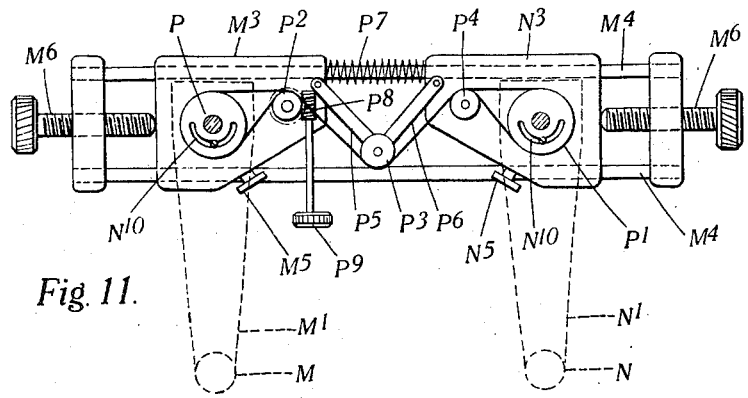
Fig. 11.
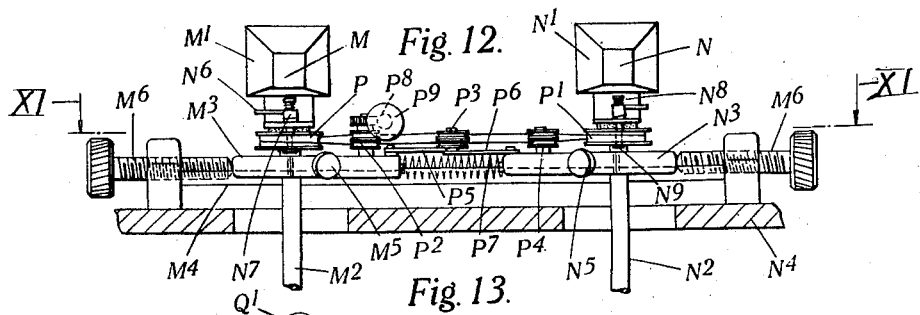
Fig. 12.
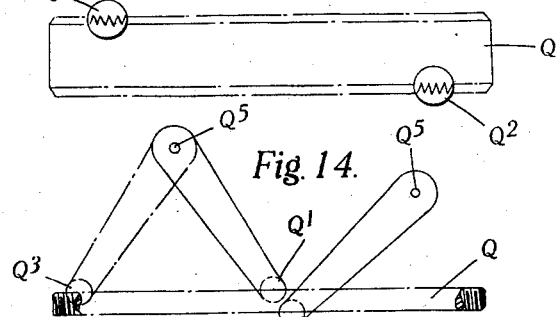
Fig. 13.
Fig. 14.
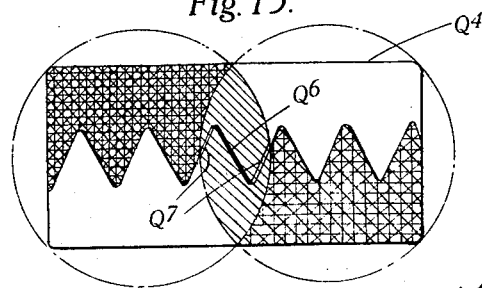
Fig. 15.
A. C. Phillips INVENTOR
BY
Blair Kilcoyne
ATTORNEYS Nov. 14, 1939.  A. C. PHILLIPS  2,179,799
OPTICAL PROJECTION APPARATUS
Filed April 27, 1938   8 Sheets-Sheet 7

INVENTOR
A. C. Phillips
BY
Blair Kilcoyne
ATTORNEYS

Nov. 14, 1939.  A. C. PHILLIPS  2,179,799
OPTICAL PROJECTION APPARATUS
Filed April 27, 1938  8 Sheets-Sheet 8
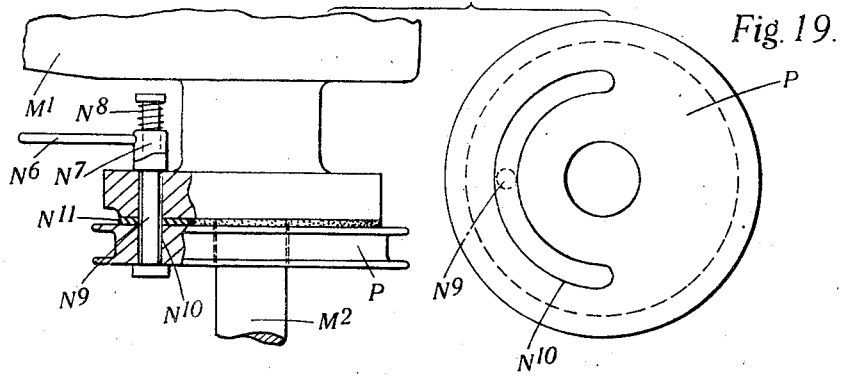
Fig. 19.
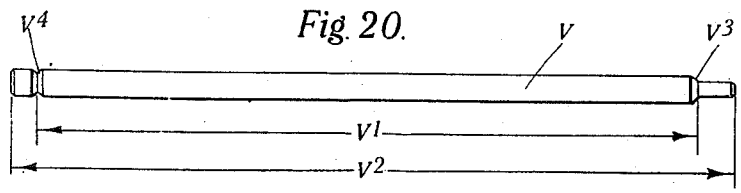
Fig. 20.
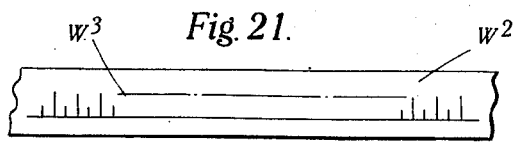
Fig. 21.
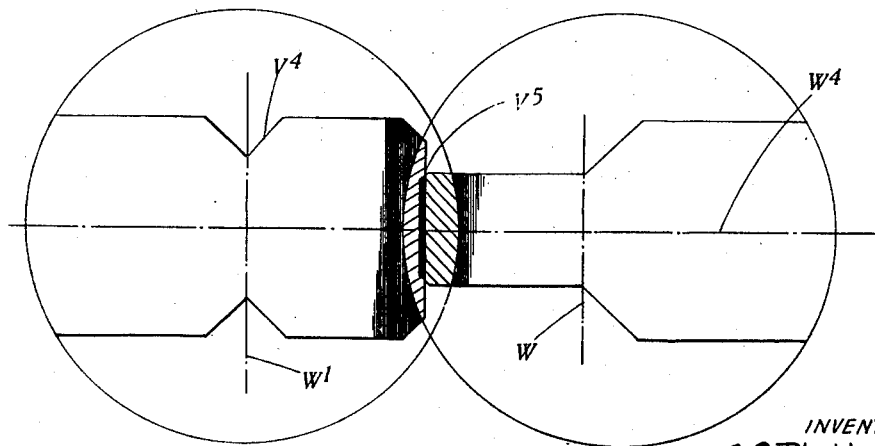
INVENTOR
BY A. C. Phillips
ATTORNEYS Patented Nov. 14, 1939

2,179,799

UNITED STATES PATENT OFFICE 2,179,799

OPTICAL PROJECTION APPARATUS

Arthur Claud Phillips, Leicester, England, assignor to Kapella Limited, Leicester, England, a company of Great Britain Application April 27, 1938, Serial No. 204,686 In Great Britain April 29, 1937

23 Claims. (Cl. 88—24)

This invention relates to optical projection apparatus, which (although applicable to other purposes) is more especially intended for checking the profiles of manufactured articles against a recognized standard. Such apparatus may be employed for example to project a magnified image of the profile of the article to be tested on a screen bearing markings which have previously been checked against the projected image of the profile of a standard article.

In one known form of apparatus of this type two optical systems with parallel axes are employed for simultaneously projecting images of two separated portions of the object under test on to the screen, whereby the two portions can be correlated with one another without the necessity of employing an optical system having a field large enough to cover the whole object. In this known arrangement the object to be tested is suitably located on a glass plate and the optical axes of the two systems are adjusted to enable the two chosen portions of the object to be imaged on the marked screen, each portion being illuminated with substantially parallel light by means of a collimating lens associated with the corresponding optical system.

The present invention has for its object to provide an improved practical construction of apparatus of the above general type.

The apparatus according to the invention is provided with two optical systems for simultaneously projecting on to a screen images of two portions of the object or objects to be viewed, and each optical system includes a member or members rotatable about a part of the optical axis of the system, whereby the object points of the two systems can be adjusted respectively along two circular arcs to vary the distance between them without altering the relative positions of the two projections on the screen. Conveniently the rotatable member or members of each optical system are carried on a rotatable rigid support and include a projection lens and reflecting devices and preferably also means including a collimating lens for illuminating the object portion to be viewed with substantially parallel light.

Figure 2:
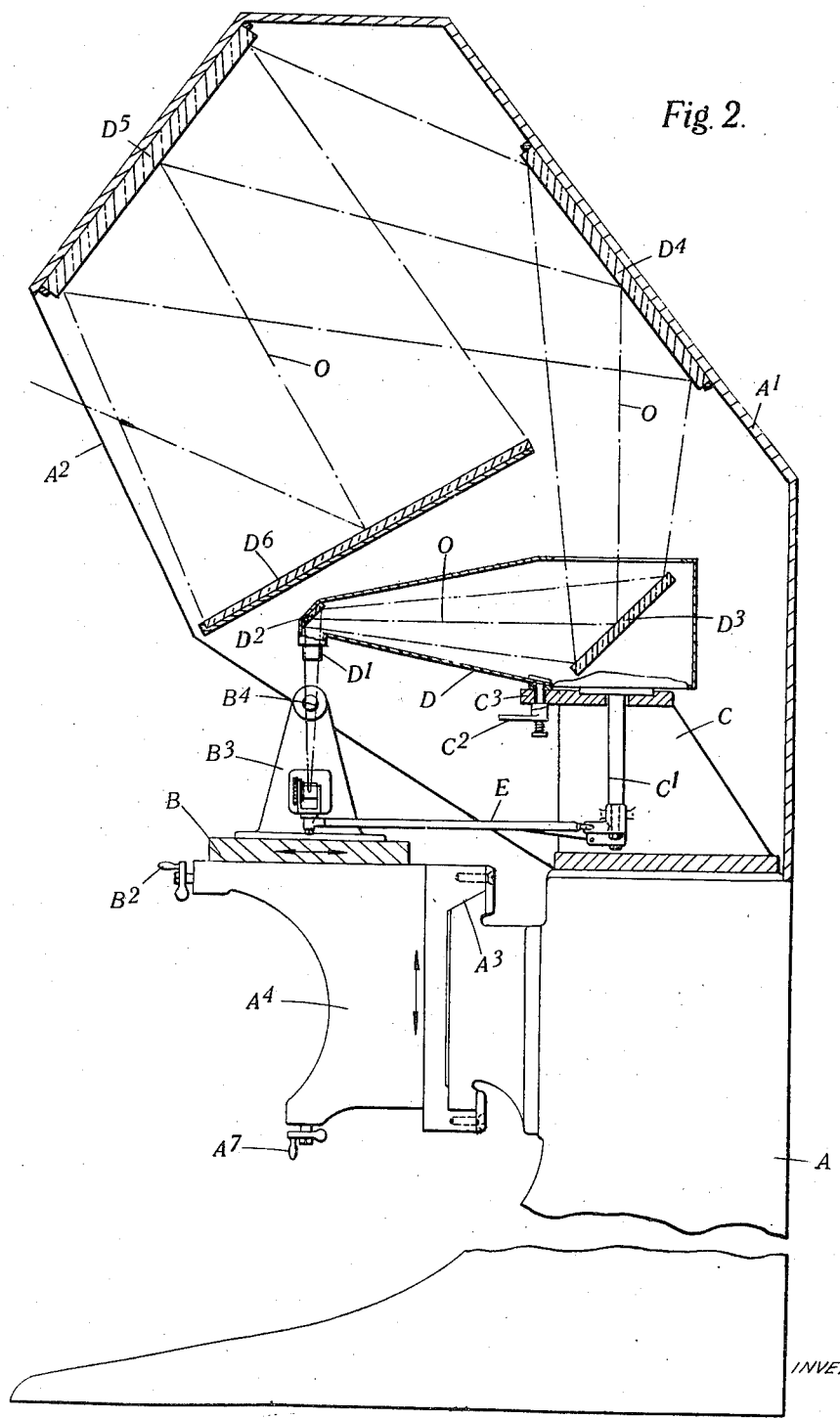
Figure 16:
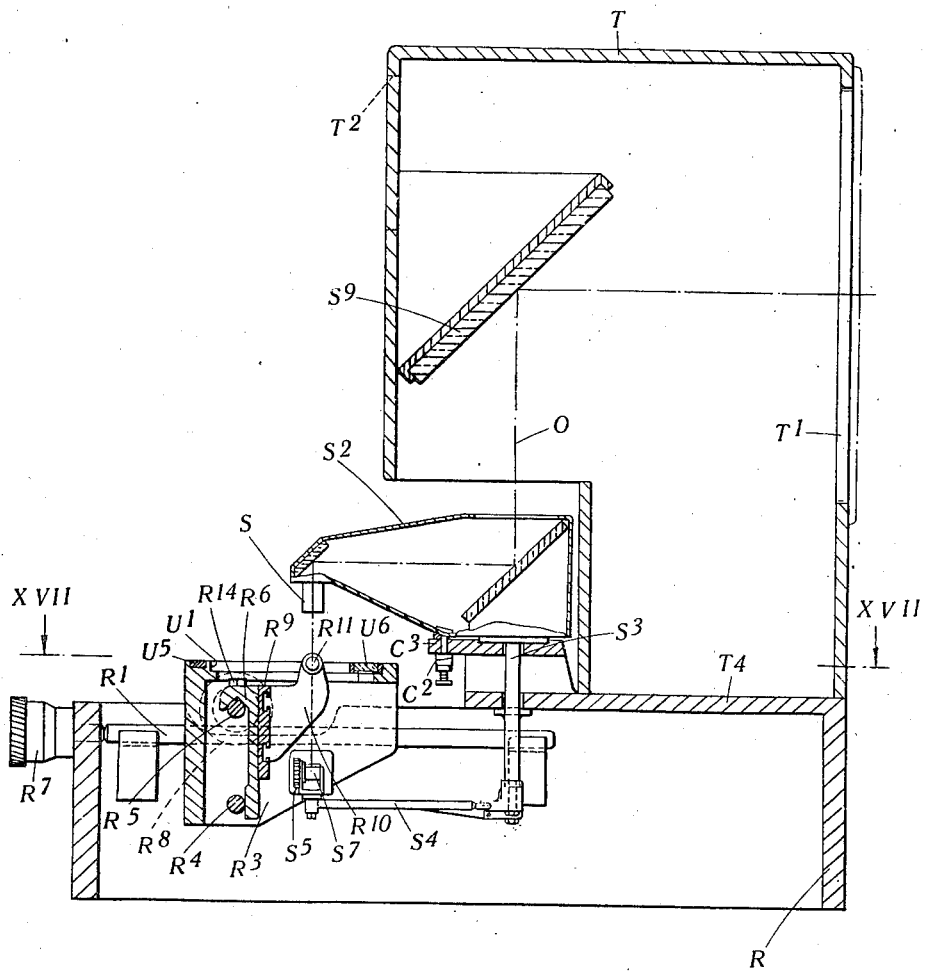
Figure 17:
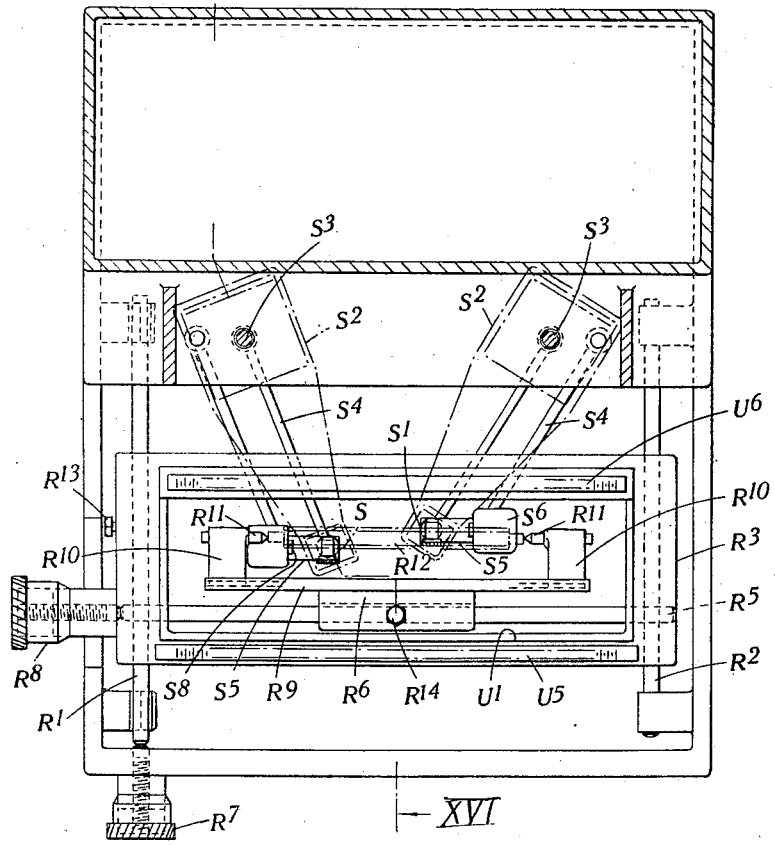
Figure 18:
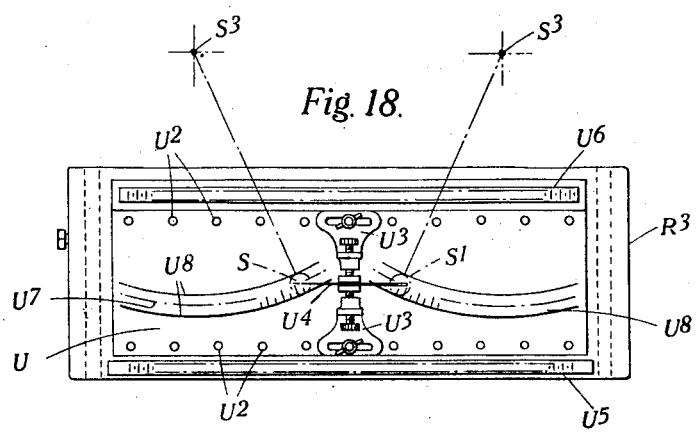

Some convenient constructions, each embodying the invention, are shown somewhat diagrammatically and by way of example in the accompanying drawings, in which Figure 1 is a front view of one construction, Figure 2 is a section on the line II—II of Figure 1, Figures 3, 4 and 5 illustrate, on an enlarged scale, and in plan, front elevation and side elevation respectively, one of the illuminating units together with the supporting linkage therefor, Figure 6 is a side elevation of a part included in Figure 3, Figure 7 shows a modified arrangement of each arm supporting a projection lens, Figure 8 is a view from right to left of the arrangement shown in Figure 7, Figure 9 is a sectional plan on the line IX—IX in Figure 7, Figure 10 shows, in side elevation, one arrangement which may be employed for illuminating the object point from above, Figure 11 is a plan on the line XI—XI of Figure 12 of one arrangement whereby the projection units can, at will, be adjusted simultaneously or independently, Figure 12 is a front view of the arrangement shown in Figure 11, Figures 13, 14 and 15 show diagrammatically the manner in which the apparatus may be employed for checking screw-threaded parts, Figures 16, 17 and 18 show another construction which can be employed for testing screwed or cylindrical parts, as also flat parts such, for example, as stampings, Figure 16 being a section on the line XVI—XVI of Figure 17 which is a section on the line XVII—XVII of Figure 16, Figure 19 illustrates one arrangement for coupling and uncoupling the rigid rotatable shafts to and from the pulleys included in Figures 11 and 12, and Figures 20 and 21 indicate one method whereby the dimensions of a part may be checked by apparatus according to the invention, for example the apparatus shown in Figures 16, 17 and 18.

In the construction shown in Figures 1 and 2 the apparatus is mounted on a base A furnished with a hood or casing $A^1$ having a front opening $A^2$. The base A has horizontal guides $A^3$ along which a bracket $A^4$ can be moved by means of a hand wheel $A^5$. The bracket $A^4$ can also be moved vertically along guides $A^6$ by means of a hand wheel $A^7$. Arranged in guides $B^1$ of the bracket $A^4$ is a table B which can be moved along the guides $B^1$ by means of a hand wheel $B^2$. The table B can thus be adjusted in three directions, namely vertically, horizontally from left to right and vice versa, and horizontally towards and away from the front of the apparatus. The table B carries two brackets $B^3$ furnished with centres $B^4$ for engaging the ends of an object, for example a screwthreaded part, whose profile is to be checked.

Mounted on the base A so as to lie within the casing A¹ is a frame C furnished with bearings for two rigid shafts C¹ which can thus turn about two vertical axes lying near the back of the table B. Each shaft C¹ has secured thereto two superimposed arms D and E extending radially from the axis of the shaft C¹ respectively above and below the level of the centres B⁴. The upper arm D of each pair carries at its free end a mount D¹ for a projecting lens with its optical axis vertical, and also a mirror D² inclined at an angle of, say, 45° to the axis of the lens carried by the mount D¹. Each mirror D² deflects the optical axis O horizontally towards the axis of rotation of the associated rigid rotatable shaft C¹ so that the optical axis meets another similarly inclined mirror D³ at the said axis of rotation, the mirror D³ deflecting the optical axis along the axis of rotation of the shaft C¹ as shown in Figure 1. Each optical axis O is then deflected by a mirror D⁴ in the back of the casing A¹ on to a forward mirror D⁵ and thence on to a projecting screen D⁶ visible through the opening A².

Each of the two lower arms E is connected by means of a vertical pivot E¹ to the base E² of an illuminating unit comprising a lamp housing F containing a lamp F¹ and a collimating lens F², and a mirror F³ arranged in a rotary mount F⁴ carried by a frame F⁵ which can be adjusted along the base E². The mirror mount F⁴ can be turned about a horizontal axis by a knurled knob F⁶ so as to tilt the mirror F³ for the purpose hereinafter described. Each base E² is supported by an auxiliary arm G¹ connected at one end by a pivot G² to the base E² and at the other end to a shaft or stub axle G carried by the frame C. Each pair of arms E, G¹ constitutes a parallel linkage, the arm G¹ serving to support the weight of the illuminating unit whilst the arm E acts as the driving member and turns about the axis of the associated shaft C¹ with the corresponding arm D and the projection lens carried thereby.

Each collimating lens F² directs a beam of substantially parallel light on to the associated mirror F³ which directs the light upwards from beneath the article, for example a screwthreaded part, held by the centres B⁴ and towards the projection lens immediately above, thus giving shadow projection of the object.

The axis of each pivot E¹ coincides with the optical axis of the projection lens above it and, with the mirror F³ in its normal position, with the vertical portion of the optical axis of the illuminating unit. By reason of the parallel linkage E, G¹, the illuminating unit is always maintained in one direction, i. e., parallel to the plane including the axes of the shafts C¹ and G.

As shown in Figures 3 and 5 each arm E fits into a socket E³ and has a groove E⁴ which cooperates with a spring latch E⁵ carried by the socket E³, thereby facilitating detachment of the arm E from the shaft C¹. Similarly, as shown in Figure 6, each arm G¹ fits into a socket G³ with the upper edge of the arm bearing against an abutment G⁴ and a groove G⁵ engaged by a pin G⁶. The arm G¹ can thus be readily detached from the socket G³ by lifting the arm so that the groove G⁵ is clear of the pin G⁶.

The dimensions of the various parts are such that each projecting lens can accurately form on the screen D⁶ an image of the object held between the centres B⁴ with a magnification of, say, twenty-five, each projection lens having an object field of, say, half an inch diameter. The axes of the shafts C¹ are equidistant from the screen D⁶ and are spaced apart by a distance which will bring the two image fields close together on the screen D⁶, preferably without overlapping, and the distance between the free ends of the arms D and the axes of the shafts C¹ is preferably not less than that which will enable the optical axes of the two projection lenses to be brought as close together as mechanical clearances will permit when the arms lie in line with one another between the axes of rotation. By swinging the arms D about their axes of rotation so that the object points of the two systems move along circular arcs, the distance between the object points can be increased from such minimum value to a maximum determined by the distance between the axes of rotation and the lengths of the arms.

The apparatus operates as follows. The table B is adjusted until two portions, for example the top and bottom, of the threaded object to be checked lie respectively within the operative object field areas of the two projection lenses, and the two arms D are then adjusted to positions in which images of the two portions are thrown on the screen D⁶ and compared with a test image or scale thereon. The arms are then locked against rotation by cam levers C² cooperating with slotted quadrants C³ the frame C. In order to avoid undesirable shadowing of the image due to the inclination or helix angle of the thread on the object, each mirror F³ is adjusted by turning the corresponding knob F⁶ so that the upwardly projected beam from the mirror F³ will be slightly inclined from the vertical in accordance with the helix angle of the thread. The frame F⁵ is then moved along the base E² in the appropriate direction to bring the illuminated area back to the object field. Each mirror mount F⁴ carries a scale F⁷ for indicating the helix angle (half-degrees of rotation of F⁴), and a scale F⁸ on the base E² for indicating the position of the frame F⁵ relatively to the said base. Thus, pitch errors and diameter errors in the screwthreaded object can be readily and quickly checked.

It will be appreciated that the rotation of either pair of arms D, E about the axis of the corresponding shaft C¹ will not affect the focussing of the image on the screen D⁶, since the axis of rotation of each shaft C¹ is always coincident with a part of the optical axis O, and moreover a line on the object parallel to the line joining the two axes of rotation of the shafts C¹ will always appear as a horizontal line on the screen D⁶ whilst a line on the object at right angles thereto will appear as a vertical line on the screen, whatever the rotational adjustment of the arms D, E.

Instead of or in addition to the vertical adjustment of the table B for focussing purposes, each projection lens may itself be bodily movable to and from the object plane. One arrangement embodying this feature is shown in Figures 7 and 8. In this construction each lens mount H is carried by a bracket H¹ connected by a parallel linkage to a U-shaped support H² secured to a vertical shaft H³ mounted to rotate in a bearing in the frame C, the two shafts H³ corresponding to the shafts C¹ described above. The parallel linkage consists of a main member or arm J and a subsidiary member J¹. The arm J is pivotally connected by a pivot J² to the bracket H¹ and by a pivot J³ to the member H², the pivots J² and J³ carrying two mirrors J⁴ and J⁵ respectively. The mirrors J⁴ and J⁵ are connected by a second parallel linkage constituted by the member J¹ and an interconnecting member $J^6$. The movements of the mirrors $J^4$ and $J^5$ about the axes of the pivots $J^2$ and $J^3$ are controlled by a 2:1 linkage consisting of a lever K pivoting on the mirror $J^5$ at $K^1$ and located at one end by a spherical pivot $K^2$ carried by the member $H^2$ as shown in Figure 8. The other end of the lever K is forked as shown to engage a spherical pivot $K^3$ carried by the arm J. As shown in Figure 7 a focussing screw $K^4$ connected to the arm J carries a knurled nut $K^5$ which bears against a fixed plate $K^6$ carried by the member $H^2$.

For focussing each projection lens the arm J is moved up or down about the pivot $J^3$ by turning the knurled nut $K^5$. Owing to the parallel linkage J, $J^1$ the projection lens remains with its optical axis always in the same direction, i. e. vertical, whilst the two mirrors $J^4$, $J^5$ remain parallel. Moreover, the cooperation of the link K with the arm J and member $J^6$ causes the mirror $J^5$ to turn about the axis of the pivot $J^3$ at half the rate at which the arm J turns about this axis, whereby the optical axis of the lens always intersects the mirror $J^4$ at the axis $J^2$ and the mirror $J^5$ at the axis $J^3$, the optical axis O thus remaining coincident with the axis of rotation of the shaft $H^3$ irrespective of the position of vertical adjustment of the projection unit H, $H^1$. The distance from the projection lens to the screen $D^6$ also remains constant in spite of the focussing adjustment, so that the magnification is not affected. The member $H^2$ may carry a scale $H^4$ cooperating with a fixed mark on the frame C. Alternatively this scale may be carried by the frame C so as to cooperate with a mark on the member $H^2$. This scale indicates the rotational position of adjustment of the arm J and its cooperating arm E which is also secured to the shaft $H^3$. Figure 9 shows the manner in which each cam lever $C^2$ cooperates with the fixed slotted quadrant $C^3$ for locking each arm in its position of adjustment.

The focussing arrangement shown in Figures 7 and 8 may be used in conjunction with a vertically movable table, for example as described with reference to Figure 1, or the necessary focussing may be obtained solely by mounting each projector unit in the manner described with reference to Figures 7 and 8.

In some uses of the machine, for example for checking surface markings on objects or the profiles of slots or grooves not extending right through the object, it may be necessary to illuminate the object from above. To this end each upper arm D or J may be employed to carry not only the projecting lens and reflectors but also the illuminating unit, and to enable the apparatus to be readily adjustable for various uses, an auxiliary illuminating unit may be provided which can be clipped or otherwise fitted on to the arm D or J when illumination from above is required.

One form of such illuminating unit, for use with the arrangement illustrated in Figures 7 and 8, is shown in Figure 10 and comprises a lamp housing L containing a lamp $L^1$ and a condensing lens $L^2$. The housing L has an integral sleeve $L^3$ adapted to fit over a rod $L^4$ carried by the bracket $H^1$ of the projector unit. By means of a thumb screw $L^5$ the unit L can be clamped in any position round the axis of the rod $L^4$ which preferably coincides with the optical axis at the object plane. The centre of the filament of the lamp $L^1$ and the centre of the object field lie approximately on the axis of the condensing lens $L^2$, the filament of the lamp $L^1$ being preferably placed approximately at the focus of the condensing lens $L^2$. In this way an intense patch of normal parallel light illuminates the work over the object field. It will be appreciated that when two illuminating units as shown in Figure 10 are employed the illuminating units described with reference to Figures 3 to 6 can be detached by withdrawing the arms E and $G^1$ from the sockets $E^3$ and $G^3$.

The two rigid rotatable supports may be free to rotate about their axes independently of one another, or they may be interconnected to ensure synchronism in their angular movements so that the line joining the two object points will always remain parallel to the line joining the axes of rotation, or again means may be provided whereby the two rigid rotatable supports can, at will, either be coupled together for synchronous movement or can be disengaged for free independent movement. Although it will usually be preferable to maintain the positions of the two axes of rotation fixed, it may in some instances be convenient to provide means for varying the distance between the two axes whilst keeping them equidistant from the screen.

One arrangement embodying the above features is shown diagrammatically and by way of example in Figures 11 and 12. In this arrangement the projection lenses M and N are carried at the free ends of two arms $M^1$ and $N^1$, these two arms being secured at or near the upper ends of two rigid rotatable shafts $M^2$ and $N^2$ respectively. The shafts $M^2$ and $N^2$ are mounted to rotate in bearings formed in two carriages $M^3$, $N^3$ which can slide along guides $M^4$ mounted on a frame $N^4$. The shafts $M^2$, $N^2$ correspond to the shafts $C^1$ or $H^3$ above described whilst the frame $N^4$ corresponds to the frame C.

The shafts $M^2$ and $N^2$ are furnished with pulleys P, $P^1$ each of which can, at will, be coupled to or uncoupled from its shafts. The carriages $M^3$ and $N^3$ have locking studs $M^5$, $N^5$ by which the shafts $M^2$, and $N^2$ can be locked against rotation in the bearings in the carriages $M^3$, $N^3$. A flexible but substantially inextensible cable extends over the pulleys P, $P^1$ and over three pairs of idlers $P^2$, $P^3$ and $P^4$, the pair of idlers $P^3$ being carried by links $P^5$, $P^6$ pivotally connected to the carriages $M^3$, $N^3$ so as to maintain the cable taut in spite of adjustment of the carriages to and from each other along the guides $M^4$. To this end the position of the pivot points of the links $P^5$ and $P^6$ on the carriages $M^3$ and $N^3$ are such that over a limited range of movement of the carriages there is no appreciable change in the length of the cable. The two carriages $M^3$ and $N^3$ are urged into engagement with two adjustable stops $M^6$ by a compression spring $P^7$ arranged on one of the guides $M^4$. The carriages may, however, be urged towards these stops by means of weights. By adjusting the stops $M^6$ the projection units M and N can be moved along the guides $M^4$ to the desired positions of adjustment.

Secured to one pair of idlers $P^2$ is a worm wheel for engagement by a worm $P^8$ operated by a knob $P^9$ either through a rigid shaft or through flexible transmission means. Each of the pulleys P and $P^1$ can be coupled to or uncoupled from its associated shaft $M^2$ or $N^2$ by operation of a locking lever $N^6$ (Figure 19) so as to cause a cam sleeve $N^7$ to act through a compression spring $N^8$ on a headed stud $N^9$ which extends into an arcuate slot $N^{10}$ in the pulley P. The stud $N^9$ thus presses the pulley P into frictional engagement with a disc $N^{11}$ fixed relatively to the shaft $M^2$ the pulley P being thus coupled to the shaft $M^2$. By releasing the lever $N^6$ the tension of the spring $N^8$ is relaxed and the pulley P is again free to turn on the shaft $M^2$.

Assuming that both the pulleys P and $P^1$ have been coupled to their shafts $M^2$ and $N^2$, rotation of the knob $P^9$ will cause the projection units M and N to move simultaneously in opposite directions so that the two optical axes at the object points will approach or recede from each other along circular arcs about the axes of rotation $M^2$, $N^2$. If now the shaft $N^2$ is clamped to its carriage $N^3$ by means of the stud $N^5$ and the pulley $P^1$ is uncoupled from the shaft $N^2$, rotation of the knob $P^9$ will cause the projection unit M to turn independently of the unit N into the desired position, whereupon the shaft $M^2$ can be clamped in the position of adjustment by tightening the stud $M^5$. When both pulleys P and $P^1$ are uncoupled from their shafts $M^2$, $N^2$ the two projection units M and N can be set as desired in any relative position independently of each other.

As indicated above the apparatus according to the invention may be employed to test the accuracy of screwthreads. Thus, pitch errors and diameter errors can be readily and quickly checked by taking the top and bottom of the thread respectively as the two portions to be imaged on the screen, and the test will be still more simplified by projecting the two images of the thread so that they are superimposed on the screen and mesh with one another.

This feature is illustrated in Figures 13, 14 and 15 in which a screwthreaded member is indicated at Q and the projection units, for example the units $D^1$ or H above described, are set so that the object fields, indicated at $Q^1$ and $Q^2$, are projected on to the screen, for example the screen $D^6$. To this end the rotating optical units are set as shown in Figure 14, one unit projecting the field $Q^2$ and the other the field $Q^1$ or the field $Q^3$. In this respect it will be appreciated that there will be a wide variety of possible settings by rotating the two projection units independently so that the separation of the field $Q^1$ and $Q^2$ on the work can be varied as required. In Figure 15 the boundary of the projection screen is indicated at $Q^4$ and the two object fields are of such a size that they overlap on the screen, the meshing of the two images being observed in this overlapping region. This preliminary setting would be obtained by using as the screwthreaded member Q, one known to be accurate both in pitch and diameter. The positions of the object fields $Q^1$ and $Q^2$ are adjusted by turning the projection units about the rigid rotatable shafts whose axes are indicated at $Q^5$, thereby bringing the thread roots of one image in line with the thread crests of the other, the rotating units being then locked against rotation, for example as described with reference to Figures 11 and 12.

To bring the images completely into mesh the separation of the axes $Q^5$ of the two projection units is adjusted until the threaded forms of the two images exactly fit together in the overlapping region.

If now a screwthreaded member to be tested is placed on the support beneath the projection units and, say, the diameter is correct but the pitch is in error, the images will appear as shown in Figure 15, that is to say with the threads overlapping at $Q^6$ and being relatively spaced at $Q^7$. At $Q^6$ no light reaches the screen so that the overlap is indicated by a dark area. At $Q^7$, however light reaches the screen from both images so that here this screen appears at full brilliance. The remainder of the overlapping image field appears half bright since light from only one image falls upon it. This region of overlap of the image fields may also be used for checking diameters and lengths generally against a standard part.

The method of projection described with reference to Figures 13, 14 and 15 does not involve modification of the reflector system. When the overlapping field is not required, the field may be reduced by a stop in the region of the back glass of the corresponding projection lens since this is being employed with parallel light. It will be understood that with this arrangement it is desirable to provide means whereby the screwthreaded object can be illuminated obliquely instead of vertically so that the direction of illumination is parallel to the rakes of the thread. This may be effected by employing adjustable illuminating units as described with reference to Figures 3, 4 and 5.

The construction shown in Figures 16 and 17 is mounted on a base R in the form of a shallow casting and carrying two rails $R^1$, $R^2$ along which a carriage $R^3$ can be adjusted. The carriage $R^3$ itself has two rails $R^4$, $R^5$ along which a saddle $R^6$ can be adjusted. The rail $R^1$ is longitudinally movable in fixed guides as shown and can be adjusted by turning a knob $R^7$ so that when this rail is locked to the carriage by a stud $R^{13}$ the carriage $R^3$ will be adjusted along the rails $R^1$, $R^2$. Similarly, the rail $R^5$ is longitudinally adjustable by means of a knob $R^8$ so that by locking the saddle to the rail $R^5$ by means of a stud $R^{14}$ and rotating this knob, the saddle $R^6$ will be adjusted along the rails $R^4$, $R^5$.

The saddle $R^6$ carries a plate $R^9$ furnished with brackets $R^{10}$ having centres $R^{11}$ for engaging the opposite ends of a cylindrical or threaded part, indicated at $R^{12}$, to be examined.

The two rotating arms for carrying the projection lenses S and $S^1$ are indicated at $S^2$ and are mounted on rigid shafts $S^3$ rotatable in bearings in a wall $T^4$ formed in the base R. Each shaft $S^3$ also carries a lower arm $S^4$ constituting part of a parallel linkage and carrying an illuminating unit $S^5$ comprising a lamp $S^6$, reflector $S^7$ and collimating lens $S^8$. The object fields S and $S^1$, illuminated by the two illuminating units respectively, are thus projected by the two projection lenses on to two mirrors $S^9$ arranged within the casing or hood T, and thence on to a screen $T^1$ within the casing. As will be clearly seen from Figure 16 part of the optical axis O of each optical system is coincident with the axis of rotation of the corresponding rigid rotatable shaft $S^3$. The two images can be viewed on the screen $T^1$ through an opening $T^2$ in the front wall of the casing T between the mirrors $S^9$. It will be understood that any of the arrangements above described for the rotating arms carrying the projection lenses and illuminating units may be incorporated in this construction.

The carriage $R^3$ has a recess $U^1$ machined in its upper face in which can be inserted a glass plate U (Figure 18) constituting a table, the saddle $R^6$ and its fittings having previously been removed. This substitution adapts the apparatus for examination of flat or thin objects which can be placed on the glass table which, when in position, lies with its upper surface approximately in the same plane as the center $R^{11}$ when these are employed, focussing being thus facilitated.

The glass plate or table U is provided with apertures $U^2$ to facilitate attachment of adjustable clamping strips or fences $U^3$. In Figure 18 the fences $U^3$ are adjusted to hold a needle $U^4$ in position for simultaneously projecting on the screen $T^1$ images of the point and eye of the needle. A further recess in the carriage $R^3$ accommodates a scale $U^5$ which is viewed by light from above the table and which facilitates setting of the object fields S and $S^1$ at the desired distance apart or to measure an unknown separation distance. A transparent scale $U^6$ may also be provided for use with transmitted light, and may be fitted into an extension of the recess $U^1$ into which the glass plate U fits. The carriage $R^3$ is adjusted along runners $R^1$, $R^2$ until part of the scale $U^5$ or $U^6$ is projected on to the screen $T^1$, when a drawing or other marking on the screen can be referred to the scale. Similarly, from the two readings obtained separations in the object plane can be readily referred to the image plane.

The screen $T^1$ may be detachable for the purpose of facilitating the attachment thereto of drawings or other marks which may be required for purposes of comparison with the projected images. A scale, as indicated at $U^7$, may be etched on the glass plate U along or close to the circular arc traced by each object point so that an image of the scale will be projected on to the screen $T^1$. It is preferable in any event to provide surface markings on the glass plate U to enable the operative areas to be readily identified. For example a pair of arcs $U^8$ may be etched on the glass plate U to define the boundaries of the image field of each lens S, $S^1$ in its various positions of adjustment, in order to facilitate locating the object to be viewed in the appropriate position on the plate U. For this purpose the fences $U^3$, when employed, may be shaped to suit the objects to be viewed and may be replaced by other fences when objects of different size and shape are to be viewed.

The apparatus shown in Figures 16 and 17 may be employed for checking the profiles of screwthreaded or other generally cylindrical objects or, by removing the saddle $R^6$ and substituting the glass table U, the apparatus may be used for checking the profiles of other manufactured articles, for example needles for knitting machines, to determine whether or not they conform accurately to the profile of a master article or drawing. For this purpose a master article may be placed between the fences $U^3$ so that two portions, for example the eye and point of the needle, lie respectively within the operative object field areas $U^8$ of the two projection lenses S and $S^1$. The two arms $S^2$ are then adjusted to positions in which images of the point and eye are thrown on the screen $T^1$, the positions of the two important features of the images being indicated on the screen by suitable markings or outline drawings. The two supports are then clamped in position and the needles to be tested are placed in turn on the glass plate against the fences in the position previously occupied by the master needle, so that their features can be compared with the markings or drawings on the screen. In this way not only the individual features of the two portions of the object but also the geometrical relationships between the two portions can be accurately tested.

Figures 20 and 21 illustrate one way in which the apparatus may be employed for checking the dimensions of a part, for example a part V whose dimensions $V^1$ and $V^2$ only are of importance. Lines W and $W^1$ are marked on the projection screen at a distance apart corresponding to the difference between the lengths $V^1$ and $V^2$ at the magnified scale. The projection lenses are then set with the aid of the scale $W^2$ so that the distance between W and $W^1$ corresponds to the length $V^1$. If the part V is of correct dimensions the lines W and $W^1$ on the screen will coincide with the smaller end of the chamfer $V^3$ on the part V and with the bottom of the groove $V^4$ respectively, and the two ends of the images will just touch at $V^5$. If however, the dimensions of the part V are incorrect, for example if the dimension $V^2$ is too large whereas the dimension $V^1$ is correct, the ends of the images will overlap at $V^5$ as shown in Figure 21.

The projection lenses may be set with the plane of their axes parallel to the plane of the axes of rotation of the two rigid rotatable supports, by setting the two projected images of parts of a line $W^3$ on the scale $W^2$ in coincidence with a line $W^4$ drawn horizontally on the projection screen.

For measuring unknown dimensions on a part marks on the screen may be set to the unknown dimensions on the projected image of the part and the scale then moved into the object field, the separation of the two marks being then read from the projected image of the scale. The plane of the optical axes at the object plane can be set parallel to the scale by means of a line drawn along the scale and a parallel line across the screen.

Each projector unit may have a diameter field of, say, half an inch, with a magnification of X.30. Other magnifications, such for example as 50, 20 or 10, may however be employed.

For testing screwthreaded objects, the glass table U is removed and the saddle $R^6$ substituted, the screwthreaded object being arranged between the centres $R^{11}$. Pitch errors and diameter errors can be readily and quickly checked by taking the top and bottom of the thread respectively as shown in Figure 17, as the two portions to be imaged on the screen. This test is still further simplified by meshing the two images of the thread as described above, the illuminating devices being preferably adjustable in accordance with the rake of the thread as described with reference to Figures 1 to 6. When the apparatus is to be employed for checking surface markings on objects or the profiles of slots or grooves which do not extend right through the object it may be necessary to illuminate the object from above either by independent illumination or by illuminating units moving with the arms carrying the projection lenses, for example as above described with reference to Figures 7 to 8.

It will be understood that the mirrors for reflecting the images on to the screen may be arranged to suit requirements. For example the mirror arrangement shown in Figures 1 and 2 may be substituted for that shown in Figures 16 and 17 or vice versa.

What I claim as my invention and desire to secure by Letters Patent is:

1. In optical projection apparatus, in combination, a projection screen, means for supporting an object whose image is to be projected on to the screen, a light source for illuminating the object, two non-collinear supports, two carriers mounted to pivot on the supports, and two optical systems mounted on the carriers respectively and which simultaneously project images of two portions of the object respectively on to the screen, each optical system comprising a projection lens and a light-deflecting device which directs the optical axis of the system into coincidence with the correspondidng pivot axis, the object points of the two systems being thus adjustable respectively along circular arcs thereby varying the distance between the object points without altering the relative positions of the two images as projected on the screen.

2. In optical projection apparatus, in combination, a projection screen, means for supporting an object whose image is to be projected on to the screen, a light source for illuminating the object, two non-collinear supports, two carriers mounted to pivot on the supports, and two optical systems mounted on the carriers respectively and which simultaneously project images of two portions of the object respectively on to the screen, each optical system comprising a projection lens mounted on the carrier at a distance from the pivot axis, a light-deflecting device mounted on the carrier and lying on the optical axis of the projection lens, and a second light-deflecting device mounted on the carrier and lying on the pivot axis, the first device deflecting the optical axis inwards towards the second device which deflects the optical axis into coincidence with the pivot axis, at least part of each optical axis being thus maintained in coincidence with the corresponding pivot axis so that the object points of the two systems can be adjusted respectively along circular arcs to vary the distance between the object points without altering the relative positions of the two images as projected on the screen.

3. In optical projection apparatus, in combination, means for supporting an object whose profile is to be checked, a light source for illuminating the object, a projection screen having markings which have previously been checked against a projected image having the profile of a standard object, two non-collinear supports, two carriers mounted to pivot on the supports, and two optical systems mounted on the carriers respectively and which simultaneously project on the screen images of two portions of the object respectively for comparison of the projected profile with the standard markings on the screen, each optical system comprising a projection lens mounted on the carrier at a distance from the pivot axis, a light-deflecting device mounted on the carrier and lying on the optical axis of the projection lens, and a second light-deflecting device mounted on the carrier and lying on the pivot axis, the first device deflecting the optical axis inwards towards the second device which deflects the optical axis into coincidence with the pivot axis, at least part of each optical axis being thus maintained in coincidence with the corresponding pivot axis so that the object points of the two systems can be adjusted respectively along circular arcs to vary the distance between the object points without altering the relative positions of the two images as projected on the screen.

4. In optical projection apparatus, in combination, a projection screen, means for supporting an object whose image is to be projected on the screen, a light source for illuminating the object, two rigid non-collinear supports, two arms extending from and pivoting about the axes of the two supports, and two optical systems which simultaneously project two portions of the object respectively on the screen, each optical system comprising a projection lens carried by the arm at a distance from the pivot axis thereof, a light-deflecting device mounted on the arm and lying on the optical axis of the projection lens, and a second light-deflecting device mounted on the arm and lying on the said pivot axis, the first device deflecting the optical axis inwards towards the second device which deflects the optical axis into coincidence with the pivot axis, at least part of each optical axis being thus maintained in coincidence with the corresponding axis of rotation so that the object points of the two systems can be adjusted respectively along circular arcs to vary the distance between the object points without altering the relative positions of the two images as projected on the screen.

5. In optical projection apparatus, in combination, a projection screen, means for supporting an object whose image is to be projected on the screen, two non-collinear supports, two arms extending from and pivoting about the axes of the supports, two devices for illuminating the object portions and moving with the two arms respectively, and two optical systems carried by the arms and which simultaneously project images of two portions of the object respectively on to the screen, each optical system comprising a projection lens carried by the arm at a distance from the pivot axis thereof, a light-deflecting device mounted on the arm and lying on the optical axis of the projection lens, and a second light-deflecting device mounted on the arm and lying on the pivot axis, the first device deflecting the optical axis inwards towards the second device which deflects the optical axis into coincidence with the pivot axis, at least part of each optical axis being thus maintained in coincidence with the corresponding pivot axis so that the object points of the two systems can be adjusted respectively along circular arcs to vary the distance between the object points without altering the relative positions of the two images as projected on the screen.

6. In optical projection apparatus, in combination, a projection screen, means for supporting an object whose image is to be projected on to the screen, two non-collinear supports, two arms extending from and pivoting about the axes of the supports, and two optical systems carried by the arms and which simultaneously project images of two portions of the object respectively on to the screen, each optical system comprising a projection lens carried by the arm at a distance from the pivot axis thereof and lying on one side of the object plane, a light-deflecting device mounted on the arm and lying on the optical axis of the projection lens, and a second light-deflecting device mounted on the arm and lying on the pivot axis thereof, the first device deflecting the optical axis inwards towards the second device which deflects the optical axis into coincidence with the pivot axis, at least part of each optical axis being thus maintained in coincidence with the corresponding pivot axis so that the object points of the two systems can be adjusted respectively along circular arcs to vary the distance between the object points without altering the relative positions of the two images as projected on the screen, a second arm carried by each support and extending therefrom on that side of the object plane remote from the associated projection lens, and an illuminating device carried by each second arm, each pair of superimposed arms turning together about the axis of the corresponding support.

7. In optical projection apparatus, in combination, a projection screen, means for supporting an object whose image is to be projected on to the screen, two non-collinear supports, two arms extending from and pivoting about the axes of the two supports, and two optical systems carried by the arms and which simultaneously project images of two portions of the object respectively on to the screen, each optical system comprising a projection lens carried by the arm at a distance from the pivot axis thereof and lying on one side of the object plane, a light-deflecting device mounted on the arm and lying on the optical axis of the projection lens, and a second light-deflecting device mounted on the arms and lying on the pivot axis, the first device deflecting the optical axis inwards towards the second device which deflects the optical axis into coincidence with the pivot axis, at least part of each optical axis being thus maintained in coincidence with the corresponding pivot axis so that the object points of the two systems can be adjusted respectively along circular arcs to vary the distance between the object points without altering the relative positions of the two images as projected on the screen, a second arm carried by each support and disposed on that side of the object plane remote from the associated projection lens, and an illuminating device carried by the second arm, the first arm which carries the projection lens swinging about the pivot axis as a unit with the second arm which constitutes part of a parallel linkage whereby the illuminating device is maintained parallel to a given direction irrespective of the movement of the two superimposed arms about the corresponding pivot axis.

8. In optical projection apparatus, in combination, a projection screen, a transparent table for supporting an object whose image is to be projected onto the screen, two non-collinear supports, two arms extending from and pivoting about the axes of the supports, and two optical systems carried by the arms and which simultaneously project images of two portions of the object respectively on to the screen, each optical system comprising a projection lens carried by the arm at a distance from the pivot axis thereof and lying on one side of the table, a light-deflecting device mounted on the arm and lying on the optical axis of the projecting lens, and a second light-deflecting device mounted on the arm and lying on the said pivot axis, the first device deflecting the optical axis towards the second device which deflects the optical axis into coincidence with the pivot axis, at least part of each optical axis being thus maintained in coincidence with the corresponding pivot axis so that the object points of the two systems can be adjusted respectively along circular arcs to vary the distance between the object points without altering the relative positions of the two images as projected on the screen, a second arm carried by each support and disposed on that side of the table remote from the corresponding projection lens, and a device carried by the second arm for illuminating the object, each pair of superimposed arms carrying the projection lens and illuminating device turning together about the corresponding pivot axis.

9. Optical projection apparatus as claimed in claim 6, in which each illuminating device comprises a light source and a reflector which illuminates the object portion from that side thereof remote from the projection lens, and an adjustable mounting is provided for the reflector whereby this can be adjusted relatively to the optical axis of the projection lens.

10. Optical projection apparatus as claimed in claim 4, in which each arm carrying a projection lens constitutes part of a parallel linkage which permits adjustment of the projection lens to and from the object plane whilst maintaining the optical axis of the projection lens parallel to a given direction.

11. In optical projection apparatus, in combination, a projection screen, means for supporting an object whose image is to be projected on to the screen, a light source for illuminating the object, two non-collinear supports, two arms extending from and pivoting about the axes of the supports, and two optical systems carried by the arms and which simultaneously project images of two portions of the object respectively on to the screen, each optical system comprising a projection lens mounted on the arm at a distance from the pivot axis thereof, the arm constituting part of a parallel linkage which permits adjustment of the projection lens to and from the object plane without altering the direction of the optical axis of the projection lens, a reflector mounted on the arm and lying on the optical axis of the projection lens, a second reflector mounted on the arm and lying on the said pivot axis, the first reflector deflecting the optical axis on to the second reflector which deflects the optical axis into coincidence with the pivot axis, at least part of each optical axis being thus maintained in coincidence with the corresponding pivot axis so that the object points of the two systems can be adjusted respectively along circular arcs to vary the distance between the object points without altering the relative positions of the two images as projected on the screen, and a parallel linkage interconnection between the two reflecting devices on each arm, which linkage maintains the reflecting devices parallel to one another for all positions of adjustment of the arm relatively to the object plane.

12. In optical projection apparatus, in combination, a projection screen, means for supporting an object whose image is to be projected, two non-collinear supports, two arms extending from and pivoting about the axis of the supports, two optical systems carried by the arms and which simultaneously project images of two portions of the object on to the screen, each optical system comprising a projecting lens carried by the arm and lying at a distance from the pivot axis on one side of the object plane, a light-deflecting device carried by the arm and lying on the optical axis of the projection lens, a second light-deflecting device carried by the arm and lying on the pivot axis, the first device deflecting the optical axis towards the second device which deflects the optical axis into coincidence with the pivot axis, at least part of each optical axis being thus maintained coincident with the corresponding pivot axis so that the object points can be adjusted along circular arcs respectively without altering the relative positions of the images as projected on the screen, and an illuminating device carried by each arm and comprising a light source and lens whereby the object is illuminated from that side of the object plane adjacent to the projection lens.

13. Optical projection apparatus as claimed in claim 2, in which interconnecting mechanism is provided between the supports which constrains the carriers to move in synchronism about the pivot axis, a line joining the object points being thus always maintained parallel to a line joining the said pivot axes.

14. In optical projection apparatus, in combination, a projection screen, means for supporting an object whose image is to be projected on the screen, at least one support, a carrier mounted to pivot on the support, an optical system comprising a projection lens mounted on the carrier at a distance from the pivot axis, a light-deflecting device mounted on the carrier and lying on the optical axis of the projection lens, and a second light-deflecting device mounted on the carrier and lying on the pivot axis, the first device deflecting the optical axis inwards towards the second device which deflects the optical axis into coincidence with the pivot axis, at least part of the optical axis being thus maintained in coincidence with the pivot axis so that the object point of the system can be adjusted along a circular arc without altering the position of the image as projected on to the screen, a device for illuminating the object, a second carrier for the illuminating device pivoting about the axis of the said support, and interconnecting means between the two carriers which thus swing as a unit about the axis of the support.

15. Optical projection apparatus as claimed in claim 14, in which the illuminating device comprises a light source, a reflecting device and a collimating lens, the illuminating device lying on that side of the object plane remote from the projection lens.

16. In optical projection apparatus, in combination, a projection screen, means for supporting an object whose image is to be projected on the screen, at least one support, an arm mounted to pivot on the support, an optical system comprising a projection lens mounted on the arm at a distance from the pivot axis, a light-deflecting device mounted on the arm and lying on the optical axis of the projection lens, and a second light-deflecting device mounted on the arm and lying on the pivot axis, the first device deflecting the optical axis inwards towards the second device which deflects the optical axis into coincidence with the pivot axis, at least part of the optical axis being thus maintained in coincidence with the pivot axis so that the object point of the system can be adjusted along a circular arc without altering the position of the image as projected on to the screen, and a device for illuminating the object mounted on the arm, the said illuminating device comprising a light source and a condensing lens whose optical axis is in alignment with the centre of the light source and with the point at which the optical axis of the projection lens intersects the object plane.

17. In optical projection apparatus, in combination, a projection screen having markings which have previously been checked against a projected image having the profile of a standard object, means for supporting an object whose image is to be projected on the screen, a light source for illuminating the object, at least one support, an arm mounted to pivot on the support, an optical system comprising a projection lens mounted on the arm at a distance from the pivot axis, a light-deflecting device mounted on the arm and lying on the optical axis of the projector, a second light-deflecting device mounted on the arm and lying on the pivot axis thereof, the first device deflecting the optical axis inwards towards the second device which deflects the optical axis into coincidence with the pivot axis, at least part of the optical axis being thus maintained in coincidence with the pivot axis so that the object point of the system can be adjusted along a circular arc without altering the position of the image as projected on to the screen relatively to the markings thereon.

18. Optical projection apparatus as claimed in claim 2 in which mechanism is provided for adjusting the supports towards and away from each other whilst maintaining their axis equidistant from the screen.

19. Optical projection apparatus as claimed in claim 4, in which mechanism is provided for coupling the arms together so that they move in synchronism about the pivot axes, and for uncoupling them for independent adjustment thereof.

20. Optical projection apparatus as claimed in claim 12, in which each illuminating device is adjustable on the corresponding arm about an axis coincident with the optical axis of the associated projection lens, the centre of the light source and the axis of the lens of each illuminating device lying in alignment with the point at which the optical axis of the associated projection lens intersects the object plane.

21. Optical projection apparatus as claimed in claim 8, in which the table is furnished with two arcuate scales extending respectively along the circular arcs traced by the object points, an image of the scale being thus projected on the screen by each optical system.

22. In optical projection apparatus, in combination, a base, a casing carried by the base, a projection screen within the casing which has a window for viewing the screen, a transparent table for supporting an object whose image is to be projected, a carrier mounted on the base, guides on the carrier for engaging the table, two non-collinear supports carried by the base equidistant from the screen, two arms extending radially from and pivoting about the axis of the supports, two optical systems carried by the arms respectively and which simultaneously project images of two portions of the object on the screen, each optical system comprising a projection lens carried by the arm and lying above the table at a distance from the pivot axis, each arm constituting part of a parallel linkage which permits adjustment of the projection lens to and from the table whilst maintaining the optical axis of the projection lens parallel to a given direction, a light-deflecting device carried by the arm and lying on the optical axis of the projector, a second light-deflecting device carried by the arm and lying on the pivot axis, the first device deflecting the optical axis inwards to the second device which deflects the optical axis into alignment with the corresponding pivot axis, part of each optical axis being thus maintained coincident with the pivot axis so that the object points of the two projection lenses can be adjusted respectively along circular arcs thereby varying the distance between the object points without altering the relative positions of the two images as projected on the screen, interconnecting means between the reflecting devices producing a 2:1 ratio of movement of the one reflecting device with respect to the arm, two lower arms carried by the supports respectively and extending radially therefrom beneath the first arms, two illuminating devices carried by the lower arms respectively and each comprising a light source, a collimating lens and a reflector whereby the object is illuminated by parallel light from below, each lower arm constituting part of a parallel linkage which maintains the illuminating device parallel to a given direction irrespective of the movement of the arms about the axes of the supports, means for adjusting the reflector of each illuminating device about an axis transverse to the axis of the associated projection lens, means for adjusting the said axis of the reflector transversely to the optical axis of the associated projector, scales on each illuminating device for indicating the adjustments of the reflector, a scale lying beneath the projection lenses and extending parallel to the plane containing the pivot axes of the two arms, horizontal guides on the base for the said carrier, mechanism for adjusting the carrier along the guides, a support on the carrier, a saddle on the said support, centres on the saddle for engaging the object to be projected, mechanism for adjusting the saddle horizontally on the carrier, at least one fence adjustably carried by the table for positioning the object thereon, mechanism for coupling the arms together and for uncoupling the arms at will, mechanism for adjusting the supports relatively to each other, and mechanism for locking the supports in their positions of adjustment.

23. In optical projection apparatus, in combination, a base, a casing carried by the base, a projection screen carried by the casing, a carriage mounted on the base, horizontal guides on the carriage, a transparent table supported by said guides, means on the carriage for detachably supporting clamps instead of the said table, mechanism for adjusting the table along said guides, mechanism for adjusting the said clamps horizontally on the carriage, a device carried by the base for illuminating an object supported on the table, images of which object are to be projected on the screen, two non-collinear supports carried by the base, two arms extending radially from and pivoting about the axes of the supports, and two optical systems carried by the arms respectively and which simultaneously project images of two portions of the object respectively on to the screen, each optical system comprising a projection lens carried by the corresponding arm and lying at a distance from the pivot axis thereof, a light-deflecting device carried by the arm and lying on the optical axis of the projection lens, and a second light-deflecting device carried by the arm and lying on the pivot axis thereof, the first device deflecting the optical axis inwards towards the second device which deflects the optical axis into coincidence with the corresponding pivot axis, at least part of each optical axis being thus maintained coincident with the pivot axis of the corresponding arm so that the object points of the two projection lenses can be adjusted respectively along circular arcs thereby varying the distance between the object points without altering the relative positions of the two images as projected on the screen.

ARTHUR CLAUD PHILLIPS.